(12) United States Patent
Huin et al.

(10) Patent No.: US 12,122,089 B2
(45) Date of Patent: Oct. 22, 2024

(54) ADDITIVE PRINTING FILAMENT MATERIAL

(71) Applicant: BASF SE, Ludwigshafen am Rhein (DE)

(72) Inventors: Vincent P. Huin, Chambery (FR); Martin Vieille, Vimines (FR)

(73) Assignee: BASF SE, Ludwigshafen am Rhein (DE)

( * ) Notice: Subject to any disclaimer, the term of this patent is extended or adjusted under 35 U.S.C. 154(b) by 752 days.

(21) Appl. No.: 17/270,077

(22) PCT Filed: Aug. 20, 2019

(86) PCT No.: PCT/US2019/047237
§ 371 (c)(1),
(2) Date: Feb. 22, 2021

(87) PCT Pub. No.: WO2020/041291
PCT Pub. Date: Feb. 27, 2020

(65) Prior Publication Data
US 2021/0323220 A1 Oct. 21, 2021

Related U.S. Application Data

(60) Provisional application No. 62/720,497, filed on Aug. 21, 2018.

(51) Int. Cl.
*B29C 64/118* (2017.01)
*B33Y 10/00* (2015.01)
*B33Y 70/10* (2020.01)
*B33Y 80/00* (2015.01)
*C08J 5/04* (2006.01)
*D01F 1/10* (2006.01)

(52) U.S. Cl.
CPC ............ *B29C 64/118* (2017.08); *B33Y 70/10* (2020.01); *C08J 5/042* (2013.01); *C08J 5/043* (2013.01);

(Continued)

(58) Field of Classification Search
CPC ...... B29C 64/118; B29C 64/141; C08J 5/047; C08J 5/043; C08J 5/042; C08J 5/06;

(Continued)

(56) References Cited

U.S. PATENT DOCUMENTS

2001/0033923 A1 10/2001 Mulder et al.
2007/0082199 A1 4/2007 Schweizer et al.
(Continued)

FOREIGN PATENT DOCUMENTS

JP 2016-193601 A 11/2016
JP 2018-065970 A 4/2018
(Continued)

OTHER PUBLICATIONS

International Preliminary Report on Patentability received for PCT Patent Application No. PCT/US2019/047237, mailed on Mar. 4, 2021, 7 pages.

(Continued)

*Primary Examiner* — Camie S Thompson
(74) *Attorney, Agent, or Firm* — Faegre Drinker Biddle & Reath LLP (57) ABSTRACT

A filament strand (40) for additive printing includes a first core (63) comprising glass fiber (62), the first core (63) comprising between about 10%-50% by weight of the filament strand (40), a second core (65) comprising carbon fiber (64), the second core (65) comprising between about 5%-30% by weight of the filament strand (40), a thermoplastic matrix (60) comprising between about 50%-80% by weight of the filament strand (40), and a thermoplastic sizing (66, 67) coating at least one of the first (63) and second (65) cores.

20 Claims, 7 Drawing Sheets

(52) U.S. Cl.
CPC ............. *C08J 5/047* (2013.01); *D01F 1/10* (2013.01); *B33Y 10/00* (2014.12); *B33Y 80/00* (2014.12); *C08J 2323/12* (2013.01)

(58) Field of Classification Search
CPC .......... C08J 5/08; C08J 3/201; C08J 2323/12; D01F 1/10; D01F 6/06; B33Y 10/00; B33Y 70/00; B33Y 70/10; B33Y 80/00; C08K 7/06; C08K 7/14; C08K 9/04; C08K 9/08
See application file for complete search history.

(56) References Cited

U.S. PATENT DOCUMENTS

| | | |
|---|---|---|
| 2014/0050921 A1 | 2/2014 | Lyons et al. |
| 2015/0314531 A1 | 11/2015 | Mark et al. |
| 2017/0096576 A1 | 4/2017 | Bheda et al. |
| 2017/0259502 A1 | 9/2017 | Chapiro et al. |
| 2018/0093413 A1 | 4/2018 | Yuasa et al. |
| 2019/0169381 A1 | 6/2019 | Okoshi et al. |
| 2021/0024747 A1 | 1/2021 | D'Achille et al. |

FOREIGN PATENT DOCUMENTS

| | | |
|---|---|---|
| JP | 2021-521021 A | 8/2021 |
| WO | 2019/195694 A1 | 10/2019 |

OTHER PUBLICATIONS

International Search Report and Written Opinion received for PCT Patent Application No. PCT/US2019/047237, mailed on Dec. 6, 2019, 11 pages.

ADDITIVE PRINTING FILAMENT MATERIAL

CROSS-REFERENCE TO RELATED APPLICATIONS

This application is a national stage application (under 35 U.S.C. § 371) of PCT/US2019/047237, filed Aug. 20, 2019, which claims benefit of U.S. Application No. 62/720,497, filed Aug. 21, 2018, both of which are incorporated herein by reference in their entirety.

TECHNICAL FIELD

The description relates to a filament strand for additive printing comprising a first core comprising glass fiber, a second core comprising carbon fiber, a thermoplastic matrix, and a thermoplastic sizing coating at least one of the first and second cores.

BACKGROUND

Additive manufacturing systems are used to print, or build, 3D parts from digital models, which can be beneficial for rapid prototyping and manufacturing. One of the most common additive manufacturing techniques is the process known as fused filament fabrication, involves laying down a print material in layers. The print material is in the form of a filament wound on a spool. The filament is unwound, and in the case of thermoplastic print material, melted and extruded to print and produce a part.

Thermoplastic materials such as polylactic acid (PLA), acrylonitrile butadiene styrene (ABS), polyphenylsulfone (PPSF), polycarbonate (PC), and polyethylene terephthalate glycol (PETG) are used in additive manufacturing for their heat resistance properties. Typically, polypropylene (PP) is not a desirable material for additive manufacturing as PP can be difficult to print with, due to heavy warping and poor layer adhesion. Furthermore, PP has a lower tensile modulus, lower impact strength, and poorer melt strength compared to ABS and PLA.

Improvement of the mechanical properties for additive manufacturing print materials is advantageous as it is desirable for an additively manufactured part to have similar mechanical properties of an injection molded part.

BRIEF DESCRIPTION OF THE INVENTION

In one aspect, the present disclosure relates to a filament for additive printing including a first core including glass fiber, the first core comprising between about 10%-50% by weight of the filament, a second core including carbon fiber, the second core comprising between about 5%-30% by weight of the filament, a polypropylene matrix including between about 50%-80% by weight of the filament, and a thermoplastic sizing coating at least one of the first and second cores.

In another aspect, the present disclosure relates to method of producing a filament for additive printing including applying a first thermoplastic sizing to a first core comprising glass fiber, applying a second thermoplastic sizing to a second core comprising carbon fiber heating a polypropylene matrix to a molten state, and mixing the first core and second core with the polypropylene matrix to form a mixture, wherein the first core comprises between about 10%-50% by weight of the filament; the second core comprises between about 5%-30% by weight of the filament, and the polypropylene matrix comprises between about 50%-80% by weight of the filament.

DETAILED DESCRIPTION

Beneficial and advantageous features of the additive printing filament material according to various aspects described herein include increased mechanical performance due to a combination of glass fiber and carbon fiber reinforcements having a thermoplastic sizing within a thermoplastic matrix. Specifically, tensile modulus, flexural modulus, and thermal properties show a significant increase compared with an additive printing filament material having only glass fiber reinforcements.

In addition, this increase in mechanical performance of the additive printing filament material due to the combination of glass fiber and carbon fiber reinforcements can also limit warping and deformation of the final printed product when the product is printed with the hybrid reinforced filament.

Figure 1:
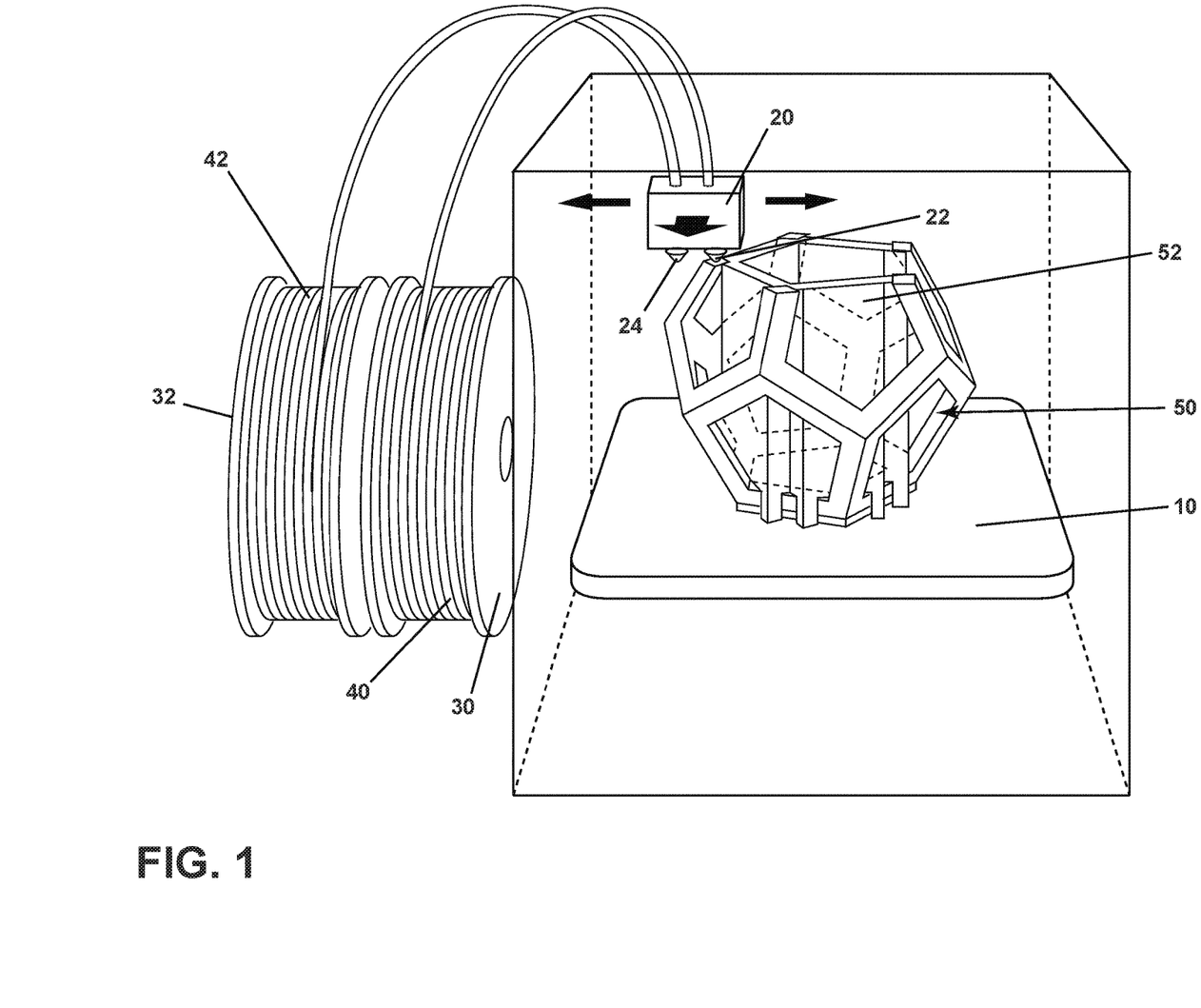
FIG. 1 is a schematic illustrating an additive printing process according to various aspects described herein.

FIG. 1 illustrates an additive printing process according to various aspects described herein. An additive printing process can include a build platform 10, an extrusion head 20 having nozzles 22, 24. Spools 30, 32 of a build material also known as an additive printing filament strand 40 and a support material 42 can be coupled with the nozzles 22, 24, respectively, where the additive printing filament strand 40 and the support material 42 can be heated and extruded, or dispensed, for printing. The extrusion head 20 can be moved in x, y, and z directions relative to the build platform 10 in a pre-determined sequence to create a part 50 by depositing the additive printing filament strand 40 and support material 42 in layers on the build platform 10. The additive printing filament strand 40 and support material 42 layers can solidify to form the part 50. The support material 42 can be used to form portions 52 of the part 50 that are removable in order to provide structure for the part 50 during the printing process. While FIG. 1 illustrates the part 50 having portions 52 for support, it is also possible that the part 50 is printed without the support material 42.

Figure 2:
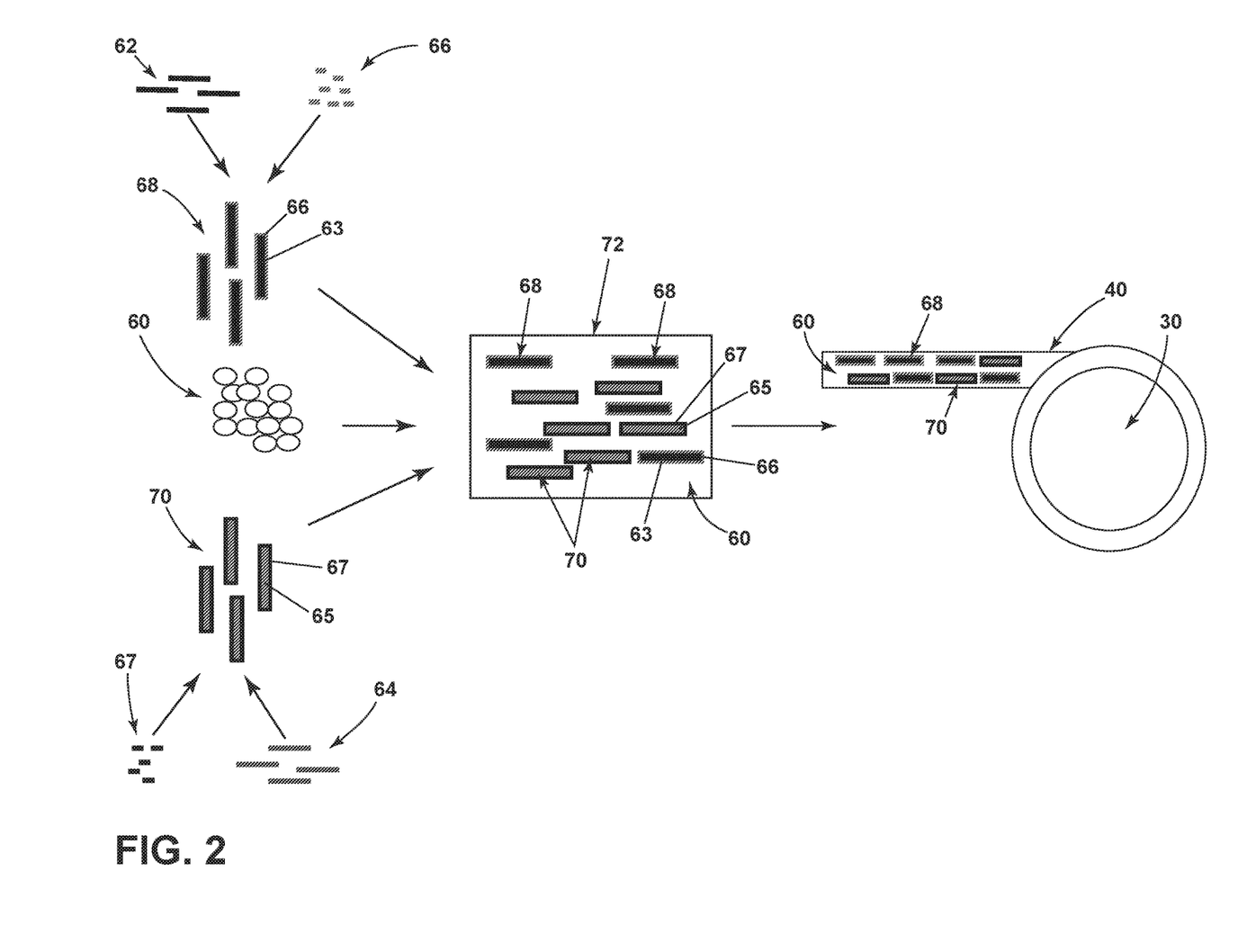
FIG. 2 is a schematic illustrating a process for forming an additive printing filament strand according to various aspects described herein.

Referring to FIG. 2, an additive printing filament strand 40 according to an aspect of the present disclosure can be formed from a hybrid material such as a composition 72 that includes a first reinforcing fiber 68, a second reinforcing fiber 70, and a thermoplastic matrix 60. Optionally, the printing filament strand 40 can further include additives including but not limited to pigments, such as anti-UV dyes, coupling agents, flame retardancy additives, viscosity modifiers, fillers, stabilizers, toughness modifiers, heat stabilizers, compatibilizers, processing aids, dispersing aids, and surfaces additives as well as other additives.

The thermoplastic matrix 60 can be polypropylene (PP), polyamide (PA6, PA8, PA11, PA12), polycarbonate (PC), polybutylene terephthalate (PBT), polyamide-imide (PAI), polyethylene (PE), polyetheretherketone (PEEK), polytherimidie (PEI), polyetherketone (PEK), polyaryletherketone (PAEK), polyethersulfone (PES), polyethylene terephthalate (PET), polyimide (PI), polyoxymethylene (POM), polyphenylether (PPE), polyphenylene sulfide (PPS), polyurethane (PUR), or any other suitable thermoplastic material. In one example, the thermoplastic matrix 60 is a polypropylene homopolymer. The thermoplastic matrix 60 can be in the range of 50% to 85% by weight of the filament strand 40, and preferably in the range of 65% to 75% by weight of the filament strand 40.

The first reinforcing fibers 68 can be comprised of a first core 63 coated with a thermoplastic-compatible sizing 66. The first core 63 can comprise glass fibers 62, such as chopped strands that can have an initial diameter of approximately 10.0 μm and a length of approximately 4.0-4.5 mm. The glass fibers 62 can be in the range of 10% to 50% by weight of the filament strand 40, and preferably in the range of 15% to 25%. In one example, the thermoplastic-compatible sizing 66 is a polypropylene thermoplastic-compatible sizing 66 suitable for the glass fibers 62.

The second reinforcing fiber 70 can be comprised of a second core 65 coated with a thermoplastic-compatible sizing 67. The second core 65 can comprise carbon fibers 64, such as chopped fibers. In one example, the carbon fibers 64 have an initial diameter of approximately 7.0 μm and a length of approximately 6.0 mm. The carbon fibers 64 can be in the range of 5% to 30% by weight of the filament strand 40, and preferably in the range of 8% to 12% by weight of the filament strand 40. In one example, the thermoplastic-compatible sizing 67 is a polypropylene thermoplastic-compatible sizing 67 suitable for the carbon fibers 64.

The thermoplastic-compatible sizings 66, 67, or thermoplastic sizings, can improve the processability of the glass fibers 62 and carbon fibers 64 by functioning as a protective coating on the surface of the fibers. Furthermore, the thermoplastic-compatible sizings 66, 67 can provide a coupling agent to enhance the bond of the glass fibers 62 and carbon fibers 64 with the thermoplastic matrix 60. The thermoplastic-compatible sizings 66, 67 can be any sizing that is compatible with the thermoplastic material in the thermoplastic matrix 60 that is also suitable for coating the glass fibers 62 and/or the carbon fibers 64. In one example, the thermoplastic-compatible sizing 66 can be a polypropylene thermoplastic-compatible sizing 66 suitable for the glass fibers 62, while the thermoplastic-compatible sizing 67 can be a polypropylene thermoplastic-compatible sizing 67 suitable for the carbon fibers 64. Alternatively, in another aspect of the present disclosure, the thermoplastic-compatible sizings 66, 67, respectively, for coating the glass fibers 62 and the carbon fibers 64, can include the same thermoplastic-compatible sizing 66, 67.

The amount of thermoplastic-compatible sizings 66, 67 used to form reinforcing fibers 68, 70 is the percentage of material on the surface of the fibers 62, 64 and is defined by the weight percentage of the total weight of each of the reinforcing fibers 68, 70. The weight percentage is measured by a loss on ignition value. The loss on ignition (LOI) can be measured by strongly heating, or igniting, a sample of material at a specific temperature such that volatile substances are allowed to escape, until the mass of the sample ceases to change using ISO 1887:2014 "Textile glass—Determination of Combustible-Matter Content". In one example, the LOI of the first reinforcing fiber 68 including the glass fiber 62 and the thermoplastic-compatible sizing 66 can be in the range of 0.55% and 0.75% by weight of the first reinforcing fiber 68. In another example, the LOI of the second reinforcing fiber 70 including the carbon fiber 64 and the thermoplastic-compatible sizing 67 can be in the range of 2.50% and 3.00% by weight of the second reinforcing fiber 70.

Figure 3:
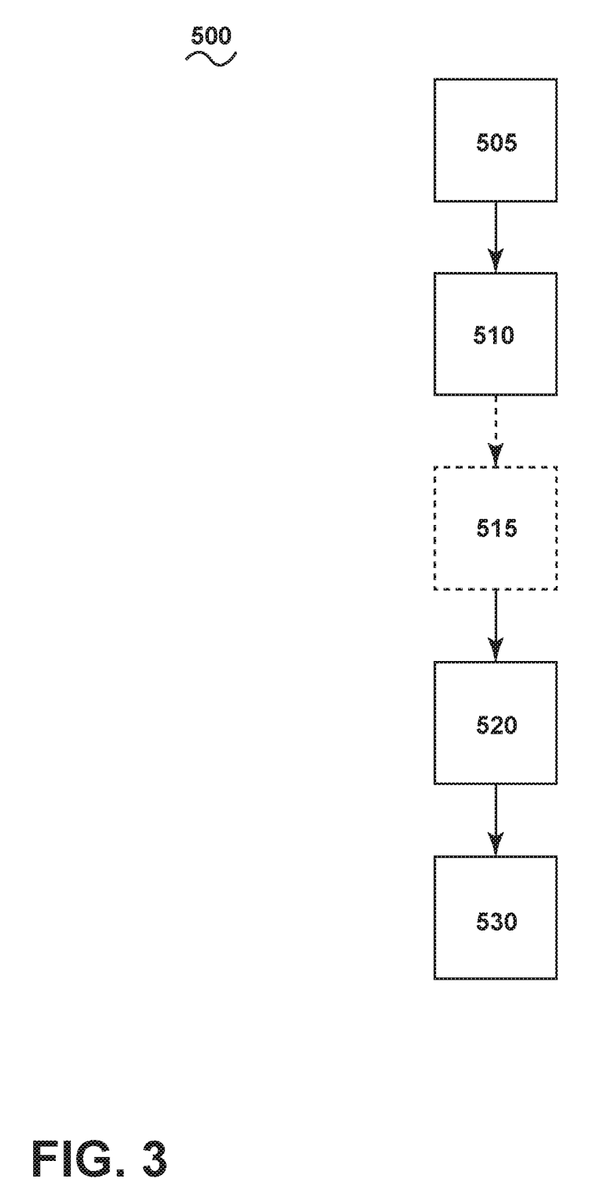
FIG. 3 is a flow chart illustrating a process for forming a filament strand according to aspects of the present disclosure.

Referring now to FIG. 3, a process, or method 500 for forming a filament strand for additive printing according to an aspect of the present disclosure is illustrated. While the method 500 is described in the context of the additive printing filament strand 40, the processes described herein may be used to form other filament strands not explicitly described herein and may proceed in a different logical order or additional or intervening steps may be included.

The method 500 for forming the additive printing filament strand 40 includes a coating step 505 to form the first and second reinforcing fibers 68, 70, a compounding step 510 to form the composition 72, followed by one or more extrusion steps 510, 515 to form the filament strand 40 at step 520. Once the filament strand 40 is formed at step 520, the filament strand 40 can be spooled and optionally further conditioned at step 530.

At 505, a first thermoplastic sizing 66 with an LOI between about 0.55-0.75% by weight of the first core 63 is applied to the first core 63 comprising glass fiber 62 to form a first reinforcing fiber 68 and a second thermoplastic sizing 67 with an LOI between about 2.5-3.0% by weight of the second core 65 is applied to the second core 65 comprising carbon fiber 64 to form the second reinforcing fiber 70.

At compounding step 510, the composition 72 is formed by blending, or compounding the thermoplastic matrix 60 with the first reinforcing fibers 68 and the second reinforcing fibers 70. In one example, a co-rotative screw heats the thermoplastic matrix 60 to a molten state and blends the reinforcing fibers 68 and 70 with the thermoplastic matrix 60 to form the composition 72. In one aspect of the present disclosure, the composition 72 includes the first core 63 comprising between about 10%-50% by weight of the filament strand 40, the second core 65 comprising between about 5%-30% by weight of the filament strand 40, and the thermoplastic matrix 60, such as polypropylene, comprising between about 50%-80% by weight of the filament strand 40. In another aspect, the composition 72 includes the first core 63 comprising between about 15%-25% by weight of the filament strand 40, the second core 65 comprising between about 8%-12% by weight of the filament strand 40, and the thermoplastic matrix 60, such as polypropylene, comprising between about 65%-75% by weight of the filament strand 40.

At 510, the composition 72 can be extruded directly from the co-rotative screw to form the filament strand 40, or optionally, at 515, the composition 72 can be fed into a second extruder, such as a single screw extruder. The composition 72 can optionally be mixed with the desired additives at step 510 and/or step 515. At 520, the composition 72 can be pulled through a nozzle to form the filament strand 40. The final diameter of the filament strand 40 can be controlled by the rate and pressure that the filament strand 40 is pulled from the nozzle of the extruder prior to entering the final die to give the final geometry of the filament strand. The final diameter of the filament strand 40 can be about 1.75 mm (+/−0.05 mm) or 2.85 mm (+/−0.05 mm). At 530, the filament strand 40 can be fed into a warm water tank where the filament strand 40 can be cooled and a round cross-section can be formed. Then, the filament strand 40 can be fed through a cold water tank such that the filament strand 40 can be cooled to room temperature. When the filament strand 40 is cooled, the filament strand 40 can be wound onto the spool 30.

Table 1 illustrates the change in the initial length of the glass fiber 62 and the carbon fiber 64 after the compounding step 210 compared to the final filament strand 40 as determined according to ISO standard 22314:2006 "Plastics—Glass-fibre reinforced products—Determination of fibre length".

TABLE 1

Length of glass fiber and carbon fiber during 3D strand manufacturing

| Fiber Type | Initial Length (mm) | After compounding (mm) | In final filament (mm) |
|---|---|---|---|
| Glass Fiber | 1.5 to 4.5 | 120-1240; [average 480] | 120-1240; [average 480] |
| Carbon Fiber | 1.5 to 6.0 | 170-980; [average 440] | 140-750; [average 360] |

Figure 4:
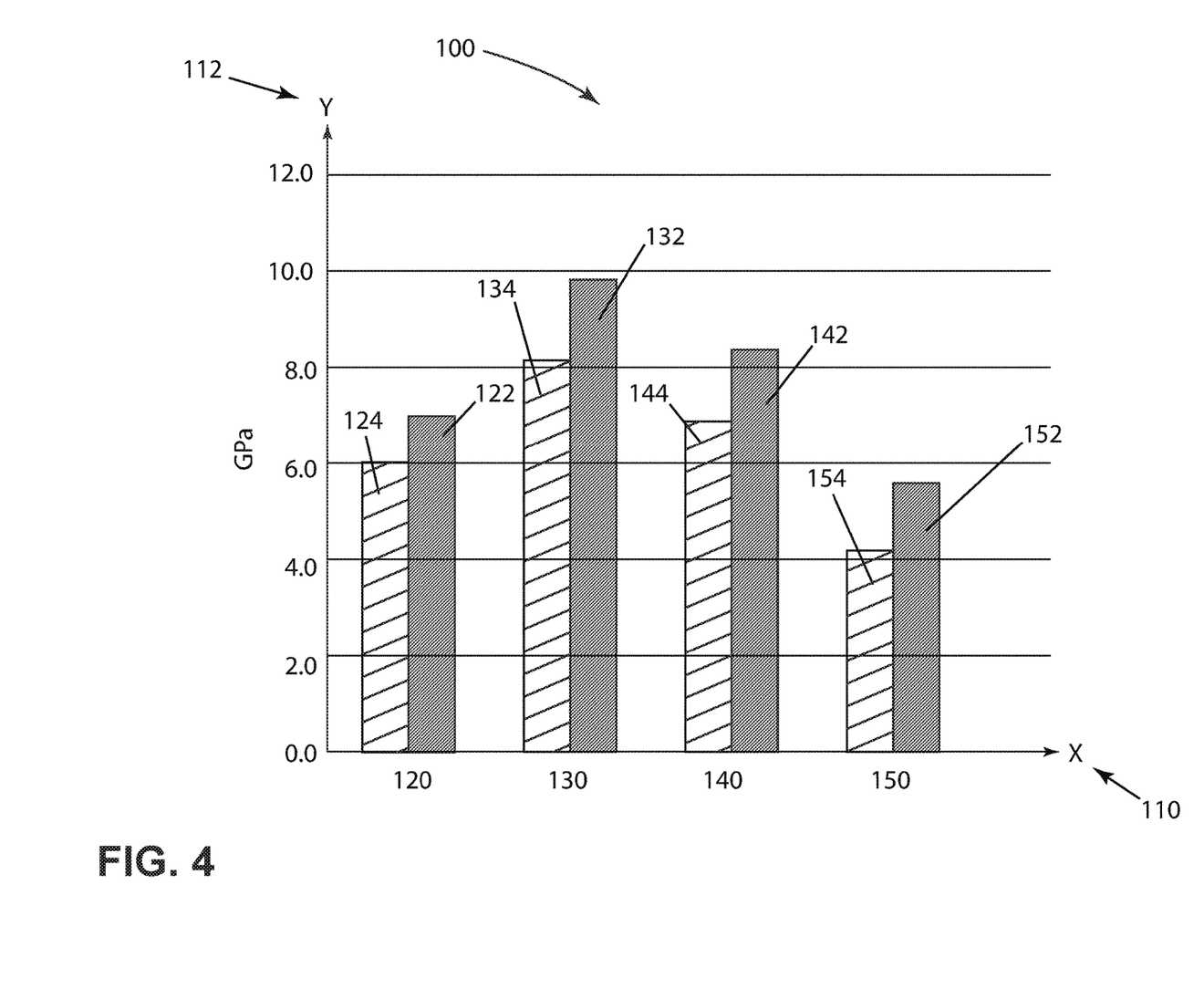
FIG. 4 is a schematic bar graph illustrating the flexural modulus of materials used for additive printing and injection molding according to various aspects described herein.

Turning to FIG. 4, a bar graph 100 compares the flexural modulus of materials having exemplary compositions according to various aspects described herein using injection molding vs. additive printing. The x-axis 110 identifies each of the various materials, while the y-axis 112 illustrates the flexural modulus, measured in gigapascals (GPa), of each material. The first material 120 is a composition having approximately 30% by weight glass fiber. The second material 130 is a composition having approximately 20% by weight glass fiber, 10% by weight carbon fiber, and a thermoplastic-compatible sizing. The third material 140 is a composition having approximately 20% by weight glass fiber, 10% by weight carbon fiber, and a thermoset-compatible sizing, and the fourth material 150 is a composition having approximately 10% by weight carbon fiber, and a thermoplastic-compatible sizing. The second material 130 represents a composition according to an exemplary embodiment of the applicant's disclosure.

As shown in the graph 100, the first material 120 has a flexural modulus of 7.0 GPa when 3D printed, as shown by bar 122 and has a flexural modulus of 6.0 GPa when injection molded, as shown by bar 124. The second material 130 has a flexural modulus of 9.8 GPa when 3D printed, as shown by bar 132 and has a flexural modulus of 8.1 GPa when injection molded, as shown by bar 134. The third material 140 has a flexural modulus of 8.4 GPa when 3D printed, as shown by bar 142 and has a flexural modulus of 6.9 GPa when injection molded, as shown by bar 144. The fourth material 150 has a flexural modulus of 5.6 GPa when 3D printed, as shown by bar 152 and has a flexural modulus of 4.2 GPa when injection molded, as shown by bar 154.

As evident from the graph 100, the second material 130 has superior flexural modulus characteristics when compared to the other materials 120, 140, and 150. When used as an additive printing filament strand 40, the flexural modulus of the second material 130 is approximately 40% higher than the first material 120, 17% higher than the third material 140, and 75% higher than the fourth material 150. When used as an injection molding filament, the flexural modulus of the second material 130 is approximately 35% higher than the first material 120, 17% higher than the third material 140, and 93% higher than the fourth material 150. Thus, the combination of glass and carbon fibers with a thermoplastic-compatible sizing as in the second material 130 demonstrates an increased flexural modulus compared to a material having only glass fiber as in the first material 120 or a material having glass and carbon fibers with a thermoset-compatible sizing as in the third material 140 or a material having only carbon fibers with a thermoplastic-compatible sizing as in the fourth material 150.

Figure 5:
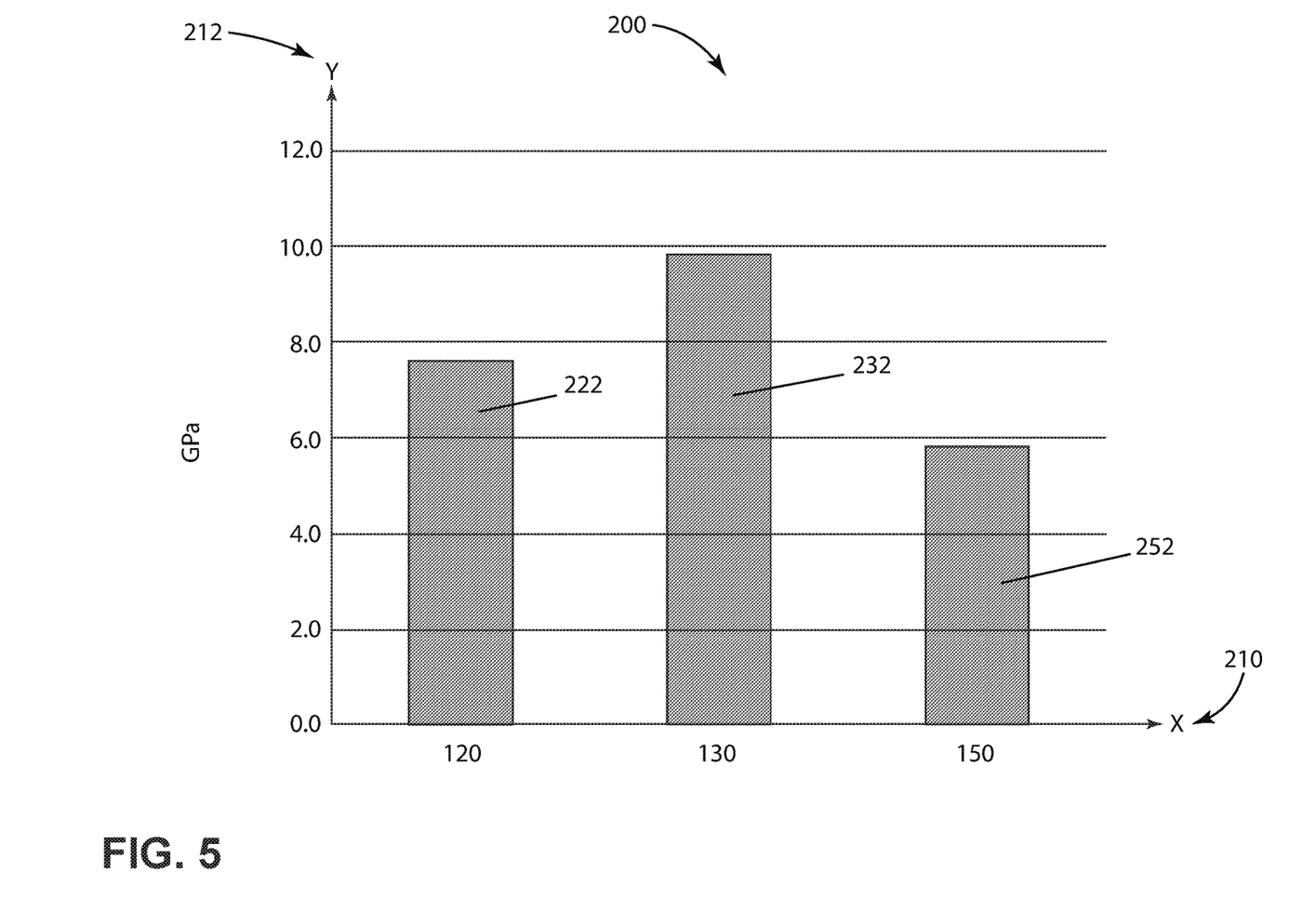
FIG. 5 is a schematic bar graph illustrating the tensile modulus of materials used for additive printing according to various aspects described herein.

FIG. 5 illustrates a bar graph 200 comparing the tensile modulus, measured in gigapascals (GPa), of the first material 120, the second material 130, and the fourth material 150 used for additive printing according to various aspects described herein. Comparison to the third material 140 was not completed. The x-axis 210 identifies each of the various materials, while the y-axis 212 illustrates the tensile modulus, measured in gigapascals (GPa), of each material.

As shown in the graph 200, the first material 120 has a tensile modulus of 7.604 GPa when 3D printed, as shown by bar 222. The second material 130 has a tensile modulus of 9.825 GPa when 3D printed, as shown by bar 232. The fourth material 150 has a tensile modulus of 5.810 GPa when 3D printed, as shown by bar 252.

As evident from the graph 200, the second material 130 has superior tensile modulus characteristics when compared to the other materials 120 and 150. When used as an additive printing filament strand 40, the tensile modulus of the second material 130 is approximately 29% higher than the first material 120 and approximately 69% higher than fourth material 150. Thus, the combination of glass and carbon fibers with a thermoplastic-compatible sizing as in the second material 130 demonstrates an increased tensile modulus compared to a material having only glass fiber as in the first material 120 or a material having carbon fiber with a thermoset-compatible sizing as in the fourth material 150.

Figure 6:
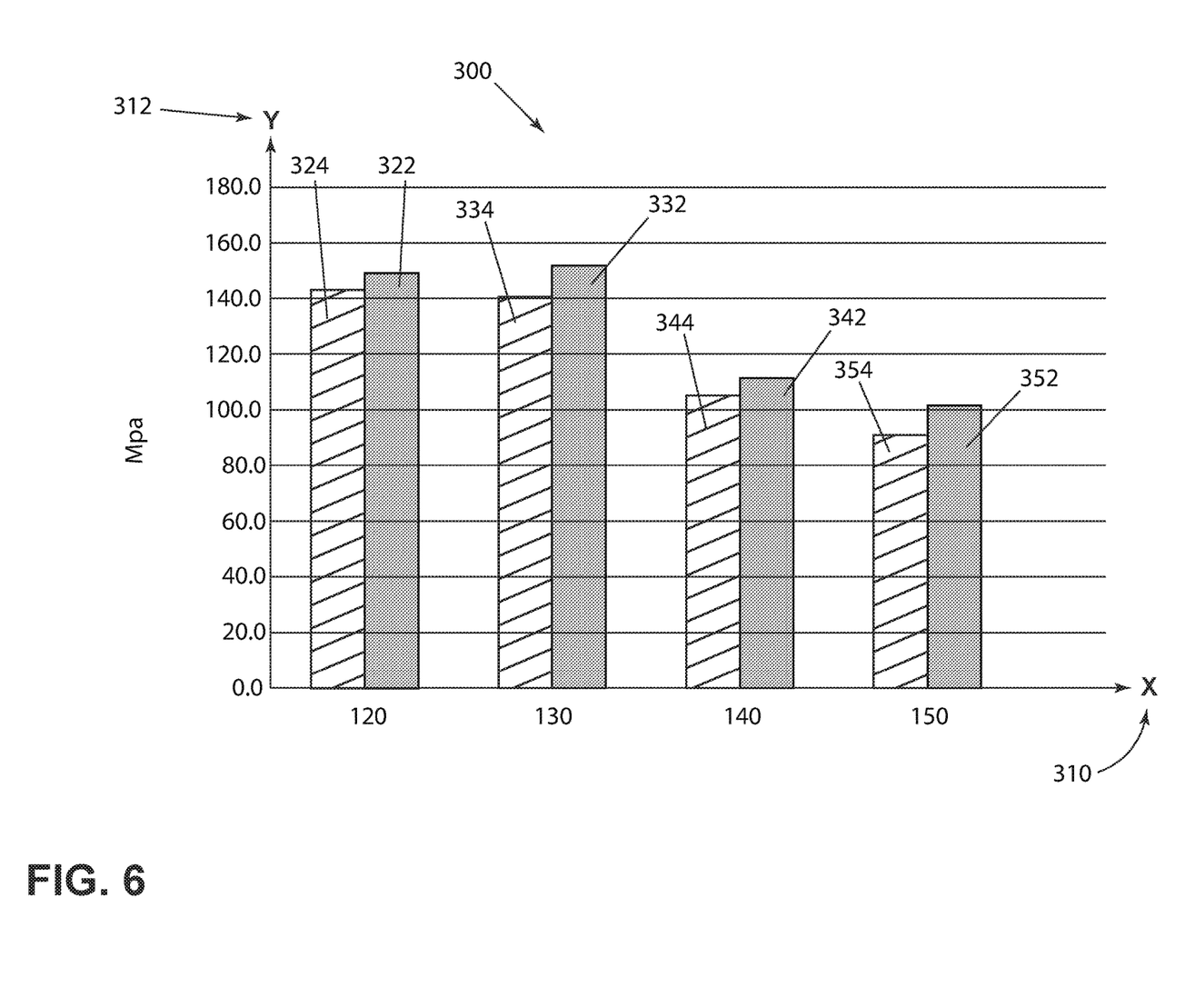
FIG. 6 is a schematic bar graph illustrating the flexural strength of materials used for additive printing and injection molding according to various aspects described herein.

FIG. 6 illustrates a bar graph 300 comparing the flexural strength of the materials 120, 130, 140, and 150 with various material compositions according to various aspects described herein when #3D printed vs. injection molded. The x-axis 310 identifies each of the various materials 120, 130, 140, and 150, while the y-axis 312 illustrates the flexural strength, measured in megapascals (MPa), of each material.

As shown in the graph 300, the first material 120 has a flexural strength of 149.0 MPa, when 3D printed, as shown by bar 322 and has a flexural strength of 143.0 MPa when injection molded, as shown by bar 324. The second material 130 has a flexural strength of 152.0 MPa, when 3D printed, as shown by bar 332 and has a flexural strength of 141.0 MPa when injection molded, as shown by bar 334. The third material 140 has a flexural strength of 111.0 MPa when 3D printed, as shown by bar 342, and has a flexural strength of 105.0 MPa when injection molded, as shown by bar 344. The fourth material 150 has a flexural strength of 102.0 MPa when 3D printed, as shown by bar 352, and has a flexural strength of 91.0 MPa when injection molded, as shown by bar 354.

As evident from the graph 300, the second material 130 has similar flexural strength characteristics when compared to the first material 120 and superior flexural strength characteristics when compared to the other materials 140, and 150. When used as an additive printing filament strand 40, the flexural strength of the second material 130 is approximately 37% higher than the third material 140, and 49% higher than the fourth material 150. When used as an injection molding filament, the flexural strength of the second material 130 is approximately 34% higher than the third material 140, and 55% higher than the fourth material 150. Thus, the combination of glass and carbon fibers with a thermoplastic-compatible sizing as in the second material 130 demonstrates an increased flexural strength compared to a material having glass and carbon fibers with a thermoset-compatible sizing as in the third material 140 or a material having only carbon fibers with a thermoplastic-compatible sizing as in the fourth material 150.

Figure 7:
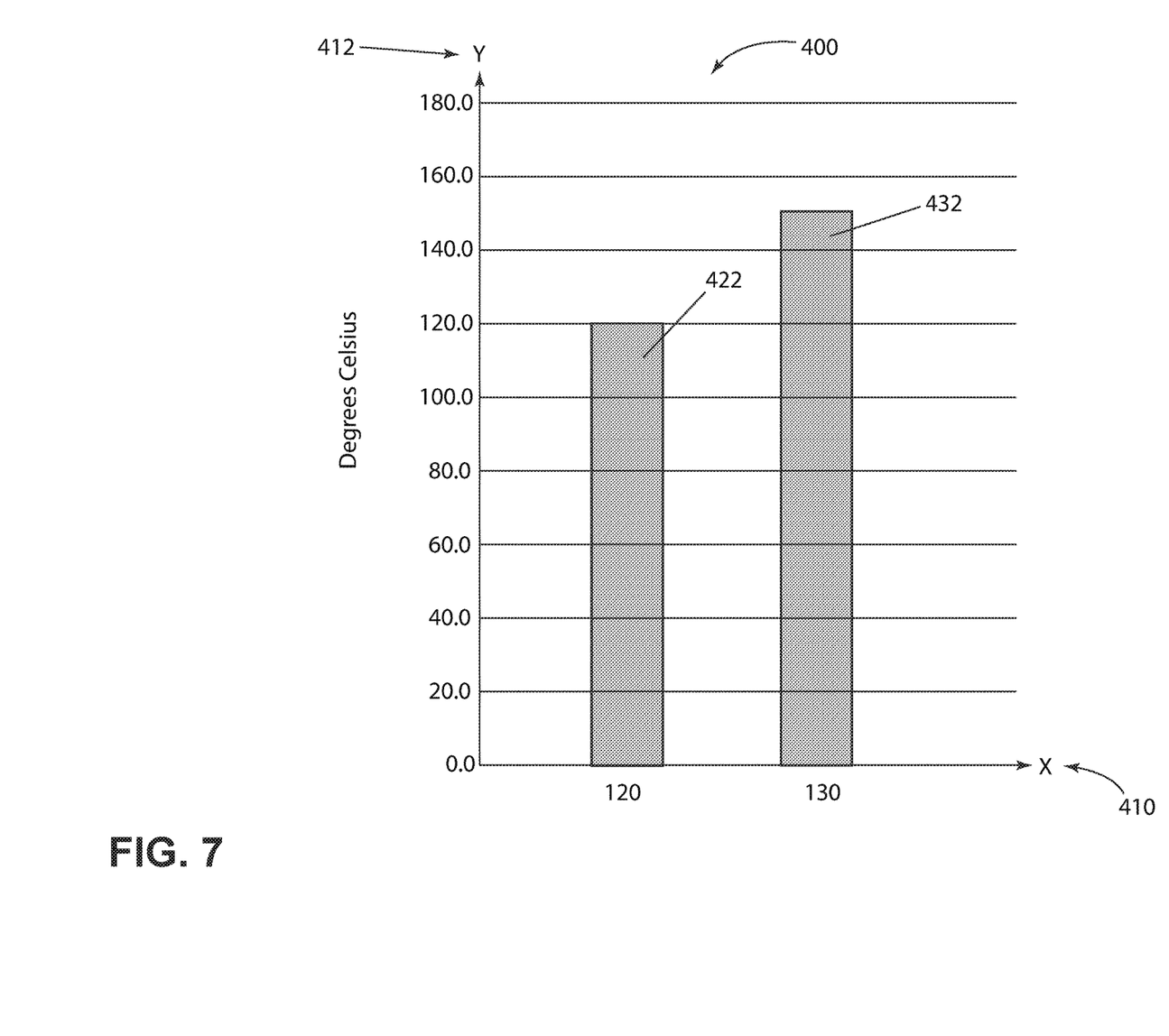
FIG. 7 is a schematic bar graph illustrating the heat resistance of materials used for additive printing according to various aspects described herein.

FIG. 7 illustrates a bar graph 400 comparing the heat resistance of the first material 120 and the second material 130. The x-axis 410 identifies each of the materials, while the y-axis 412 illustrates the heat deflection temperature, measured in degrees Celsius, of the materials 120, 130. The heat deflection temperature of the first material 120 and the second material 130 were tested according to ISO 75 Standard Method A at a load of 1.8 MPa. Heat deflection temperature is defined as the temperature at which a standard test bar deflects a specified distance under a load. Heat deflection temperature is used to determine short-term heat resistance.

As shown in the graph 400, the first material 120 has a heat deflection temperature of 120° C., as shown by bar 422. The second material 130 has a heat deflection temperature of 150° C., as shown by bar 432. Therefore, the second material 130 has a higher heat resistance than the first material 120 by approximately 25%. Thus, the second material 130 comprising a combination of glass and carbon fibers with a thermoplastic-compatible sizing demonstrates an increase in thermal properties compared to the first material 120 having only glass fiber.

The aspects of the disclosure described herein can include an additive manufacturing print filament material that can provide a final part having comparable mechanical properties to an injection molded part. Therefore, the part, or prototype, produced with a printing filament strand according to aspects described herein can be a cost effective solution compared to injection molding as a mold is not required to make the prototype. Furthermore, a prototype produced from a filament strand according to aspects described herein can be tested in real conditions due to the increase in mechanical properties compared to a part additively manufactured with traditional printing filaments.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:
1. A filament strand for additive printing comprising;
  a first core comprising glass fiber; the first core comprising between about 10%-50% by weight of the filament strand;
  a second core comprising carbon fiber; the second core comprising between about 5%-30% by weight of the filament strand;
  a thermoplastic matrix comprising between about 50%-80% by weight of the filament; and
  a thermoplastic-compatible sizing coating at least one of the first and second cores, wherein the thermoplastic-compatible sizing is a first thermoplastic-compatible sizing that coats the first core and a second thermoplastic-compatible sizing coats the second core.

2. The filament strand for additive printing of claim 1, wherein the thermoplastic matrix comprises at least one of polypropylene, polyamide, or polycarbonate, polybutylene terephthalate, polyamide-imide, polyethylene, polyetheretherketone, polyetherimide, polyetherketone, polyaryletherketone, polyethersulfone, polyethylene terephthalate, polyimide, polyoxymethylene, polyphenylether, Polyphenylene sulfide, or polyurethane.

3. The filament strand for additive printing of claim 1, wherein the thermoplastic matrix comprises polypropylene.

4. The filament strand for additive printing of claim 1, wherein the glass fiber is chopped strand.

5. The filament strand for additive printing of claim 4, wherein the final dimensions for chopped strands in the filament strand are 200 μm to 500 μm.

6. The filament strand for additive printing of claim 1, wherein first core comprises between about 15%-25% by weight of the filament.

7. The filament strand for additive printing of claim 6, wherein the first core comprises about 20% by weight of the filament strand.

8. The filament strand for additive printing of claim 1, wherein the second core comprises between about 8%-12% by weight of the filament strand.

9. The filament strand for additive printing of claim 8, wherein the second core comprises about 10% by weight of the filament strand.

10. The filament strand for additive printing of claim 9, wherein the thermoplastic matrix comprises between about 65%-75% by weight of the filament strand.

11. The filament strand for additive printing of claim 1, wherein first core comprises between about 15%-25% by weight of the filament strand, wherein the second core comprises between about 8%-12% by weight of the filament strand, wherein the thermoplastic matrix comprises between about 65%-75% by weight of the filament strand.

12. The filament strand for additive printing of claim 11, wherein the thermoplastic-compatible sizing is a first thermoplastic sizing that coats the first core and a second thermoplastic-compatible sizing coats the second core.

13. The filament strand for additive printing of claim 1, wherein the thermoplastic matrix (60) is a homopolymer.

14. A method of producing a filament strand for additive printing comprising
  applying a first thermoplastic-compatible sizing to a first core comprising glass fiber;
  applying a second thermoplastic-compatible sizing to a second core comprising carbon fiber;
  heating a thermoplastic matrix to a molten state;
  mixing the first core and second core with the thermoplastic matrix to form a composition; and extruding the composition to form the filament strand, wherein the first core comprises between about 10%-50% by weight of the filament strand; the second core comprises between about 5%-30% by weight of the filament strand; and the thermoplastic matrix comprises between about 50%-80% by weight of the filament strand.

15. The method of producing a filament strand for additive printing of claim 14, wherein extruding the composition comprises a compounding step and an extrusion step to give one or more desired final dimensions to the filament strand.

16. The method of producing a filament strand for additive printing of claim 14, wherein the one or more desired dimensions of the filament strand is a diameter of 1.5 mm to 1.9 mm.

17. The method of producing a filament strand for additive printing of claim 14, wherein the one or more desired dimensions of the filament strand is a diameter of 2.5 mm to 3.1 mm.

18. The method of producing a filament strand for additive printing of claim 14, wherein the first core comprises between about 15%-25% by weight of the filament strand, wherein the second core comprises between about 8%-12% by weight of the filament strand, and wherein the thermoplastic matrix comprises between about 65%-75% by weight of the filament strand.

19. The method of producing a filament strand for additive printing of claim 14, wherein the glass fiber is chopped strand.

20. The method of producing a filament strand for additive printing of claim 19, wherein the final dimensions for chopped strands in the filament strand are 100 μm to 1500 μm.

* * * * *